US006213500B1

(12) United States Patent
Jost et al.

(10) Patent No.: US 6,213,500 B1
(45) Date of Patent: Apr. 10, 2001

(54) AIRBAG

(75) Inventors: Stefan Jost, Eppstein; Matthias Volkmann, Kronberg; Markus Jost, Wiesbaden; Udo Bonsch, Neu-Isenburg; Peter Priemer, Ebsdorfergrund; Albrecht Kretschmar, Frankfurt A.M., all of (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/403,159

(22) PCT Filed: Apr. 17, 1998

(86) PCT No.: PCT/GB98/01130

§ 371 Date: Oct. 15, 1999

§ 102(e) Date: Oct. 15, 1999

(87) PCT Pub. No.: WO98/47744

PCT Pub. Date: Oct. 29, 1998

(30) Foreign Application Priority Data

Apr. 18, 1997 (GB) .................................................. 97 07 857

(51) Int. Cl.[7] ..................................................... B60R 21/16
(52) U.S. Cl. ..................................... 280/730.2; 280/743.1
(58) Field of Search .............................. 280/730.2, 743.1

(56) References Cited

U.S. PATENT DOCUMENTS 5,586,782 * 12/1996 Zimmerman, II et al. ....... 280/730.2
5,718,450 * 2/1998 Hurford et al. .................. 280/730.2
5,730,464 * 3/1998 Hill ................................. 280/730.2
5,791,685 * 8/1998 Lachat et al. .................... 280/730.2

FOREIGN PATENT DOCUMENTS 0 714 818 * 6/1996 (EP) .
0 769 428 * 4/1997 (EP) .
0 810 125 * 12/1997 (EP) .
0 830 991 * 3/1998 (EP) .
2 753 665 * 3/1998 (FR) .
2 299 061 * 9/1996 (GB) .

* cited by examiner

Primary Examiner—Kenneth R. Rice
(74) Attorney, Agent, or Firm—Markell Seitzman

(57) ABSTRACT

A side impact airbag (10) and a method of folding. The airbag (10) comprises a head and a thorax compartment (5,6) separated by a panel (4) of airbag fabric and pneumatically linked by a vent hole (13) in the panel (4). On inflation the panel is adjacent the shoulder of an average occupant.

The airbag (10) may be made of two or three pieces of fabric. If only two pieces are used then the dividing panel (4) is formed from part of one or both of the other two pieces. The inflation profile of the airbag (10) may be controlled by tethers (8) or by mounting it at 10°–40° to the horizontal. Tethers and stitching may also be used. The two compartments (5,6) may be of different weight and denier; a higher weight fabric for the lower, thorax, compartment (6), and a lower weight fabric for the upper head compartment (5).

An airbag folding method is also described.

22 Claims, 11 Drawing Sheets

PACKAGING SIZE

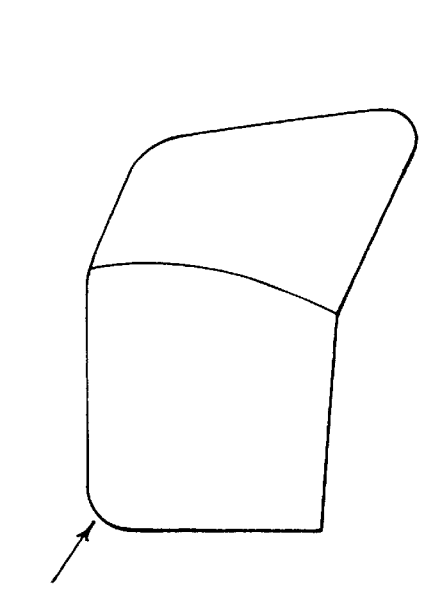
TUCK  Fig. 26.
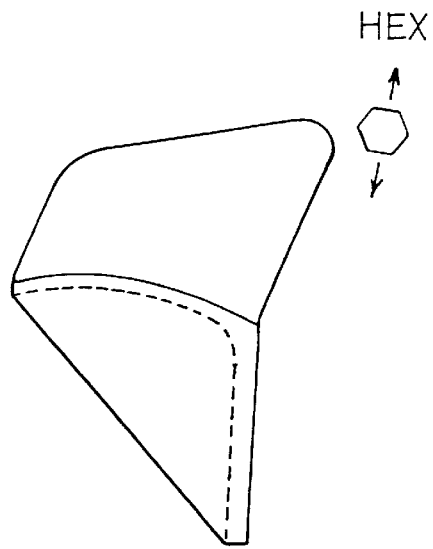
HEX
Fig. 27.
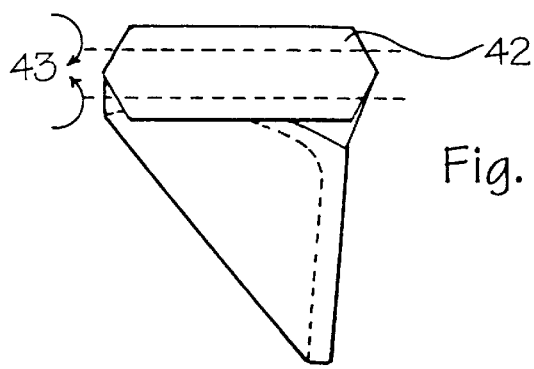
Fig. 28.
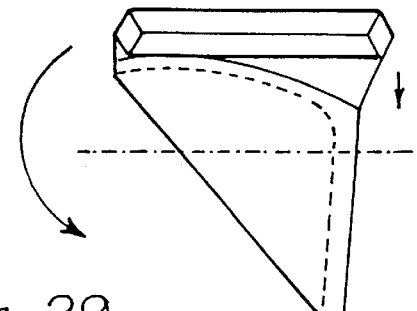
Fig. 29.

FLAP OVER

PACKAGING SIZE

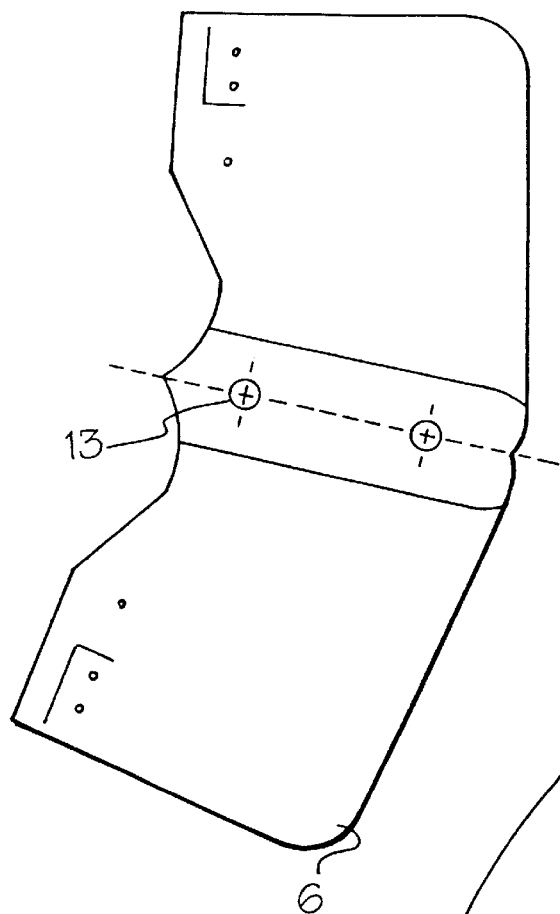
Fig. 34a.
Fig. 34b.
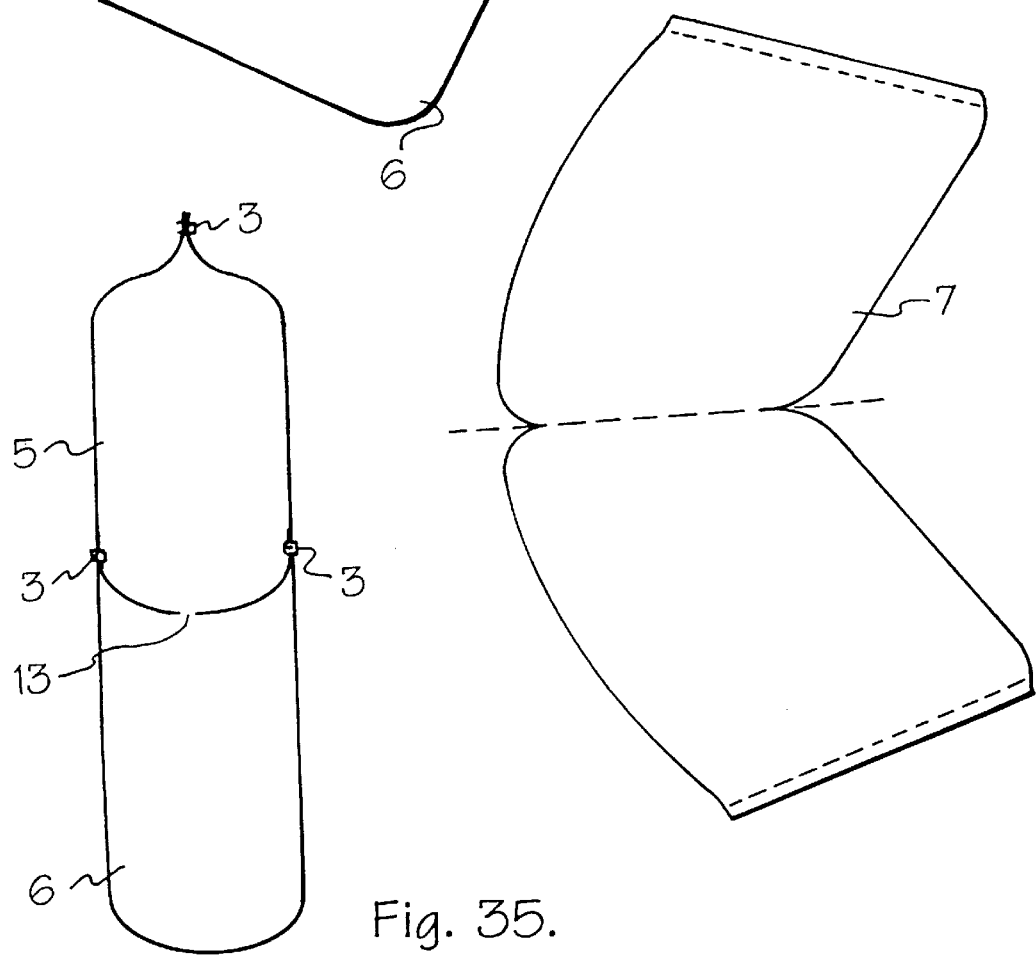
Fig. 35.

AIRBAG

The present invention relates to an airbag for a vehicle safety restraint and particularly to a side impact airbag to protect a vehicle occupant from injury in the event of the vehicle sustaining a laterally inflicted impact, and to a method of folding a side impact airbag.

Side impact airbags are known and are for example described in applicant's own International application published under number WO 96/07563, the subject matter of which is incorporated by reference into the present application. A side impact airbag with two compartments to protect respectively the head and the thorax of an occupant, is also known from GB 2 229 061.

The object of the present invention is to provide an improved side impact protection device, in particular a side impact airbag and also to provide an improved method of folding the same.

A problem occurs in side impact airbags in that the occupant's door-side arm tends to interfere with and restrict the correct inflation of the airbag. This can result in injuries to the occupant's air and/or shoulder.

An object of one aspect of the present invention is to provide an improved side impact airbag which is shaped and mounted so as to inflate at such a speed and in such a direction as to reduce the risk of inflation induced injuries to the vehicle occupant.

According to a first aspect of the invention there is provided a side impact airbag comprising a first and a second inflatable compartment, the first compartment being adapted and mounted in a vehicle in a position from which it can inflate, on deployment in the event of a crash, to occupy an area generally adjacent to the thorax and the shoulder of a vehicle occupant, and the second inflatable compartment being adapted to inflate, on deployment, to occupy an area generally adjacent to the head of the vehicle occupant, wherein the first and the second compartments are separated one from the other by a dividing panel formed of airbag fabric and are pneumatically connected to each other by means of at least one vent hole formed in the panel, characterised in that fabric of a first weight is used for the lower compartment which protects the thorax and shoulder areas of the vehicle occupant, and the second, upper, compartment of the airbag, which protects the head of the occupant, is formed of fabric of a second, lower, weight.

Advantageously the lower compartment has a hole for receiving inflation gas from an inflation the event of airbag deployment, and the dividing panel is arranged so that it will be in a position approximately at the level of the occupant's shoulder when the airbag is fully inflated.

The lower compartment may thus be of increased size compared to known dual cavity airbags and this allows the airbag to inflate more quickly past the arm of an occupant and thus for the upper, second compartment to pass the shoulder and thus restrain the head earlier in a crash event. Traditional side impact airbags tend to have a problem of interference with a occupant's arm, whereas this invention reduces that problem.

According to one embodiment the airbag is formed of three pieces of fabric stitched together: a first piece forms one side wall of the airbag, a second piece forms a second side wall and a third piece forms the panel dividing the two compartments. Of course, additional material may be used for one/or more tethers, and or for reinforcing the gas inlet opening and/or for other strengthening.

Preferably the airbag is arranged and mounted so that as it inflates a rotational force is imparted to the upper, outer region of the airbag (relative to the vehicle occupant) to bias the airbag to move towards the occupant. This twisting motion may be imparted by mounting the airbag at an oblique angle to the horizontal, for example at an angle of between 10° and 40° to the horizontal.

Optionally the inflation profile of the airbag and the elongation of it towards the occupant during deployment is further controlled by retaining tethers within one or both inflatable compartments and/or by stitches either joining the side panels of the airbag together, or forming one or more tucks in one or both sides. The stitches may be tear stitches which burst at a predetermined pressure as the airbag inflates. The tethers may also have tucks in them by means of tear stitches.

The requirement for strength is not so important in the head bag as in the thorax bag, but is it preferable that the head bag deploys quickly to move past the arm and shoulder before movement of the occupant blocks its deployment path. The head bag is preferably formed of a low permeability and a low frictional fabric. For example fabric of 210 denier would be suitable for the upper head compartment and of 630 denier for the lower thorax compartment. The low denier fabric has the advantage, for the head compartment, of being of relatively low weight and will therefore move faster on deployment. The inflation characteristics of this airbag cushion gives the surprising result that there is less risk to the occupant who is out of position.

According to another embodiment this may advantageously be accomplished by forming the main side panels of the airbag together with the dividing panel from only two pieces of fabric. One piece, of a predetermined denier is folded in half and stitched at the sides and the top to form the upper head compartment. One or two vent holes are formed in the middle region and this forms the dividing panel. The second piece is folded and stitched at the sides, the open top being joined by stitching to the head section on either side of the vent hole or holes. The second piece of fabric can be of a different denier. For example 210 denier material may be used for the upper head section and heavier, less permeable 630 denier material for the lower thorax section. Of course the lower compartment may be formed first and stitched to the fabric for the upper compartment before the upper compartment is stitched.

Evidently further fabric pieces may be required for reinforcement, for example in the region of the inflation inlet, and for tethers and such like.

This arrangement requires less critical sewing lines than with the known arrangements, less pieces of fabric and is thus easier to sew, and produces overall a lighter airbag since a lighter fabric can easily be used for the upper section without prejudicing the performance of the lower compartment. The use of fabrics of different permeabilities also allows for tailoring the damping characteristics as appropriate to the body region to be protected. Previously this was only achievable by coating part of the bag which is expensive.

The airbag according to the first aspect of the invention may be mounted in a vehicle door, for example in the door trim or in the padded upholstery.

Alternatively the airbag may be mounted in the vehicle coat, either in the upholstery or in the structure of the seat itself.

According to a second aspect of the present invention there is provided a new method of folding a side impact airbag and particularly folding an airbag according to the first aspect. This folding method aims to overcome many of the disadvantages of the prior art folding methods by producing more consistent unfolding of a side impact airbag during deployment and more reliable positioning of the airbag and of the different compartments of the airbag in relation to the parts of the body of the vehicle occupant to be protected.

This new folding method comprises laying an uninflated airbag generally flat so that it presents a generally oblong shape in plan view with two opposing minor sides and two opposing major sides, the airbag having a gas inlet opening arranged at or in the region of a first minor side of the shape so formed, subsequently, folding or rolling the upper part of the airbag and folding the folded or rolled part to be on top of the lower part, and, as a first step: folding the two major sides inwardly towards a central major axis, preferably by folding the sides behind and underneath the body of the airbag; as a second step: rolling the minor side remote from the gas inlet opening down towards the gas inlet opening, preferably in a sense opposite to the first folding step (i.e. forwards and on top of the airbag) preferably rolling the fabric over three times; as a third step: turning the airbag over; as a fourth step: folding the resultant shape so as to bring the rolled second minor side generally parallel to and in close proximity with a generally diagonal line bisecting the resultant shape, in the region of the thorax portion of the airbag; as a fifth step: folding a top corner of the resultant shape over the rolled portion, as a sixth step: folding the sides inwardly on to the top of the rolled portion; and as a seventh step; folding one of the major sides over onto the shape thus formed.

Preferably the airbag comprises two interlinked inflatable compartments, adjacent each other along the major sides. A first one of the compartments has an inflation opening formed in one side wall and the walls of the second compartment comprise said rolled second minor side, so that the fourth step comprises laying the rolled minor side on the fabric of the first compartment. The first compartment is intended for protecting the thorax and shoulder of a vehicle occupant and the second compartment is intended for protecting the head of the vehicle occupant.

An airbag folded according to the second aspect of the present invention directs the upper head section (second compartment) in a vertically upward direction more quickly than in known systems so that the head section assumes an optimum safety position more quickly and thus generally lessens the risk of entanglement with the occupant's arm. This is particularly useful when the occupant is not sitting in the correct position (for example if he is slewed to the side as may happen if he is asleep). Since the airbag is primarily accelerated vertically there is a reduced cushion mass accelerating in the horizontal direction (the direction of movement of the vehicle) and this in itself will lessen the effects of impact of the airbag on parts of the occupant's body and thus reduce airbag inflicted injuries.

An airbag folded according to such a folding method also has a reduced interaction with the vehicle trim as it inflates and thus leads to improved performance of the safety restraint.

For a better understanding of the present invention, and to show how the same may be carried into effect reference will now be made, by way of example, to the accompanying drawings, in which:

FIG. 1 is a schematic side view of an airbag according to a first embodiment of the invention, for door mounting;

FIG. 2*a* illustrates the shape of a dividing panel in the airbag of FIG. 1;

FIG. 2*b* illustrates the shape of a tether used in the airbag of FIG. 1;

Figure 17A:
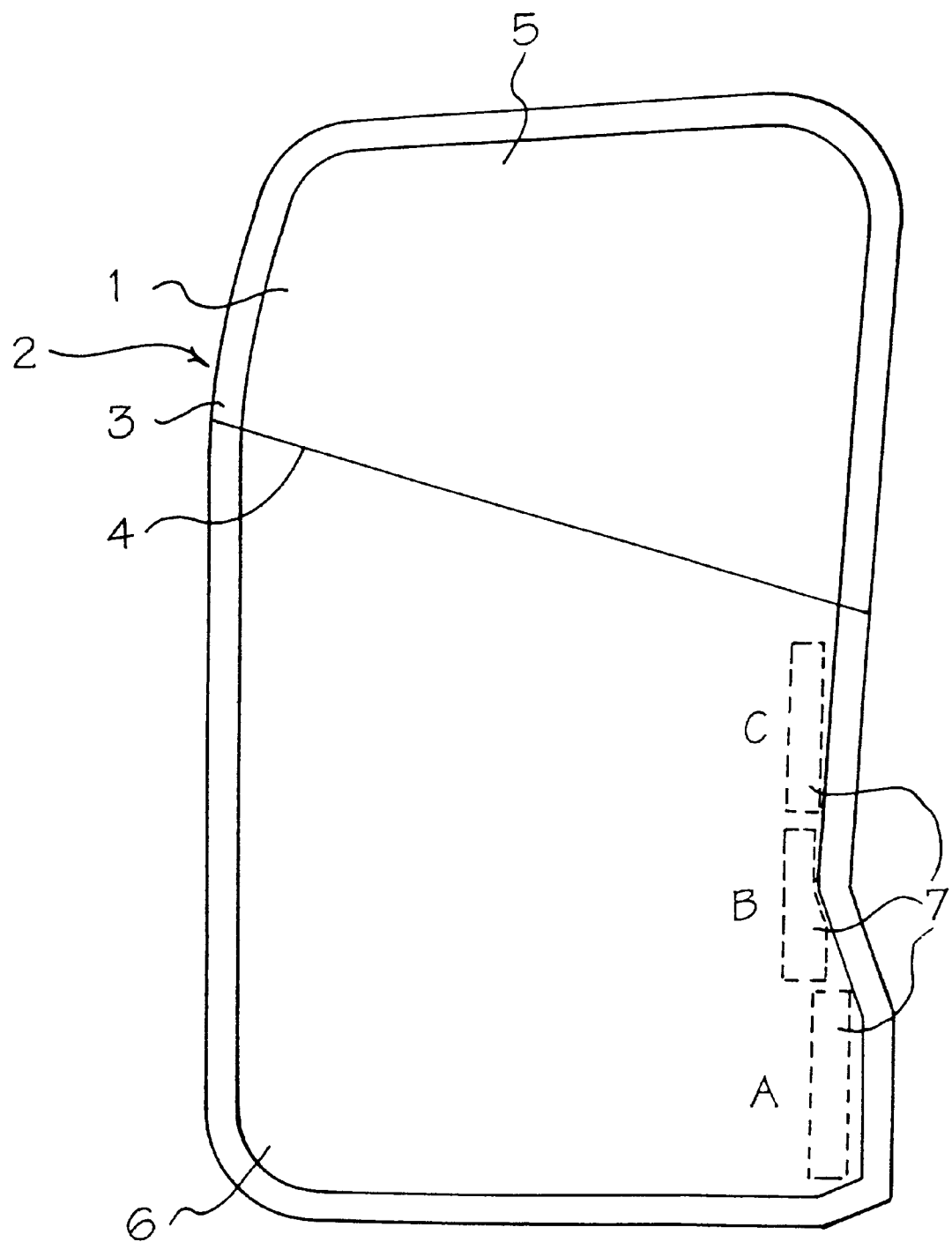
Figure 17B:
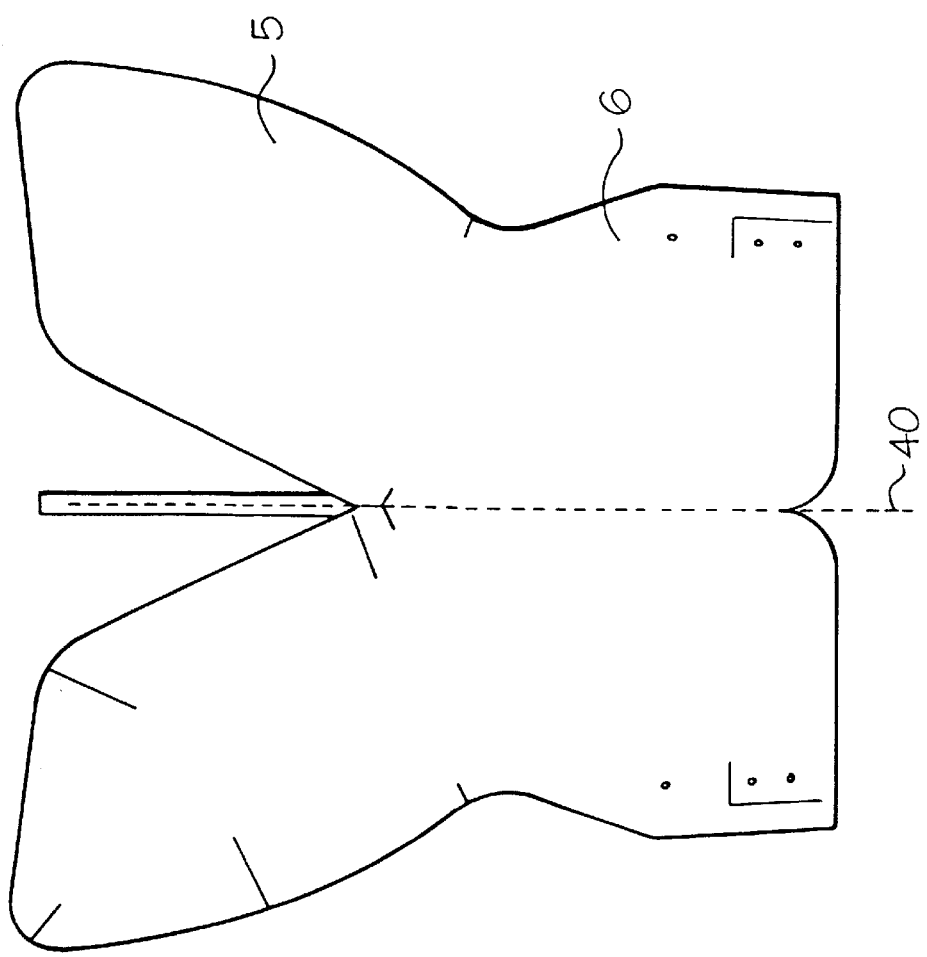
Figure 33A:
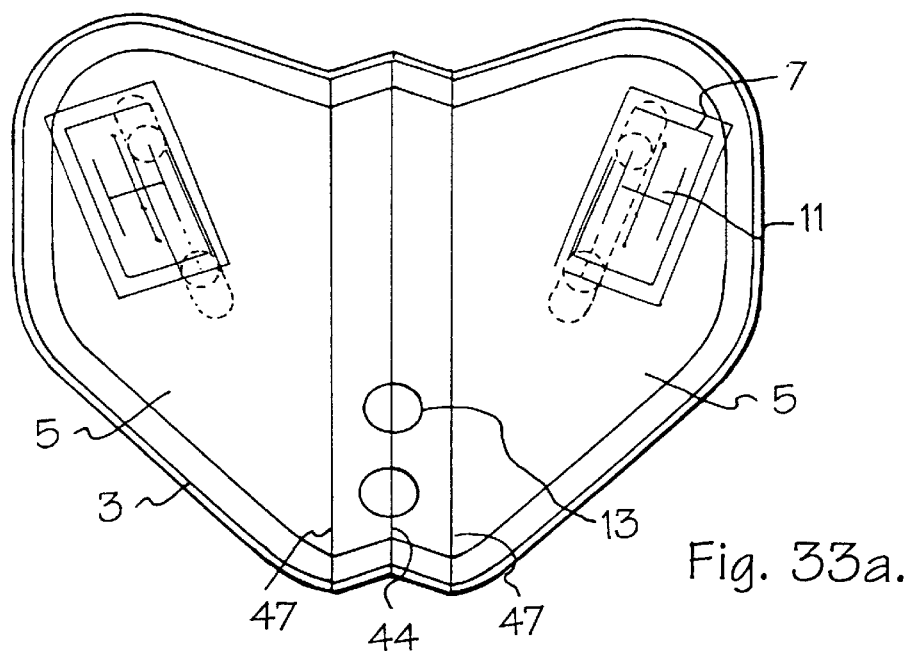
Figure 33B:
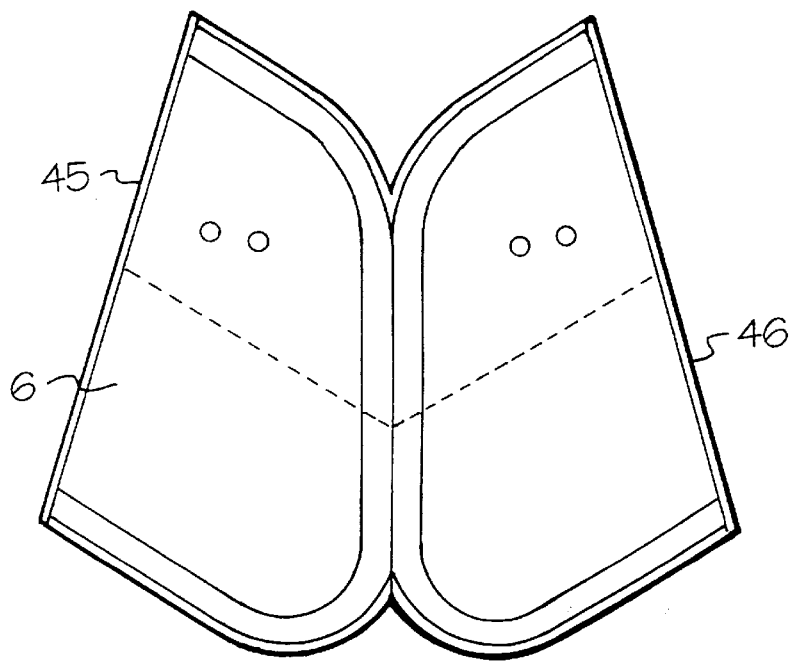

FIGS. 17*a* to 17*d* illustrate plan views of an airbag according to a second and third embodiment of the invention, for seat mounting;

FIGS. 18 to 25 illustrate a method of folding the airbag of FIG. 17*a* or 17*b*;

FIGS. 26 to 32 illustrate an alternative method of folding the airbag of FIG. 17*a* or 17*b*;

FIGS. 33*a* and *b* illustrate construction of one embodiment for an airbag according to the first embodiment of the invention;

FIGS. 34*a* and *b* illustrate the construction of another embodiment of an airbag according to the invention;

FIG. 35 is a schematic side view of the airbag constructed according to FIGS. 33 and 34.

Figure 1:
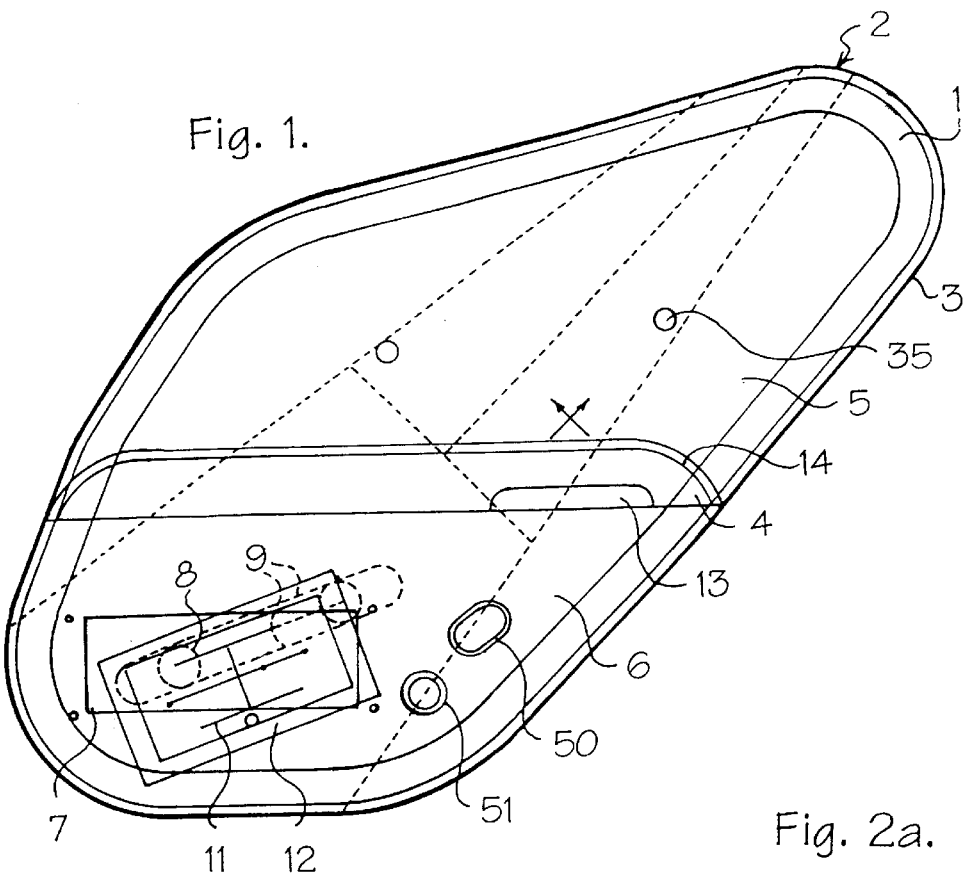

The airbag 10 of FIG. 1 is formed from two panels 1 and 2 laid on top of each other and stitched around the periphery at 3.

Figure 2A:
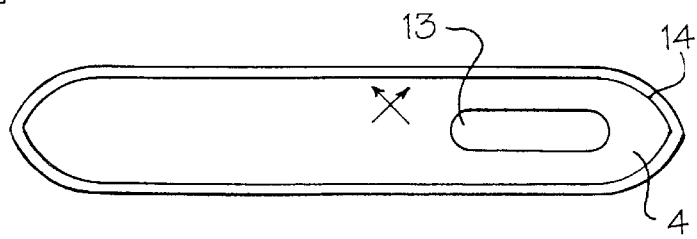

A third panel 4 is stitched along its periphery 14 to the middle of each of panels 1 and 2 to form a dividing panel between two compartments 5 and 6 of the airbag. The shape of the dividing panel 4 is shown more clearly in FIG. 2*a*.

The airbag is mounted to the vehicle (door or seat) in the mounting region 7, for example by mounting pins or rivets. A inflation inlet hole 11 comprises an H-shaped slit in a reinforcing patch 12 and this inlet hole 11 is preferably set at an angle of between 10° and 40° to the horizontal whereas the mounting is parallel to the horizontal.

Figure 2B:
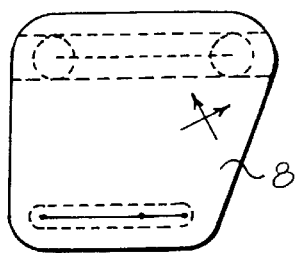

A tether 8 connects the two panels 1 and 2 in the area of the mounting region and the tether shape is shown clearly in FIG. 2*b*. The tether is connected to respective panels 1 and 2 along mounting lines 9. Additional tethers 50, 51 are arranged at the narrowest part to help the bag deploy easily in restricted areas (e.g. where the door and seat limit space on each side).

Tear stitches connect the two panels 1 and 2 at 35 to reduce the initial airbag volume and provide control to the inflation pattern.

A vent hole 13 is formed in the dividing panel 4 to allow pneumatic communication between the two compartments 5 and 6. Two holes maybe used optionally joined by a slit or a tear seam either formed by a line of stitches or by a designed structural weakness or by perforations in the vent panel fabric. Alternatively the vent panel 4 may be formed of two pieces sewn together which will separate once the pressure inside the first compartment reaches a predetermined level. This provides a safety venting facility which instantly reduces the inflation speed of the bag in a situation such as when a child is leaning against the airbag deployment direction. In this way a safety vent is provided for dangerous situations while the dual compartment airbag operates normally in other situations—inflation gas passing at a controlled rate through the vent hole or holes 13.

The broken lines across the body of the airbag in FIG. 1 indicate fold lines for the method of the invention and will be described later in reference to FIGS. 4 to 16.

Figure 3:
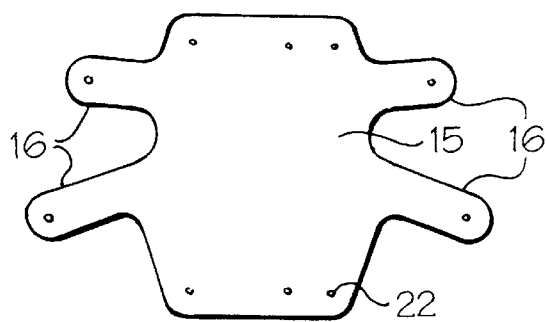
FIG. 3 illustrates the shape of an airbag cover used to enclose the airbag of FIG. 1 when it is folded.

FIG. 3 shows the shape in plan view of a suitable cover 15 for the airbag. This is typically of paper and has a generally oblong shape with laterally extending arms 16; two on each long side of the oblong.

A method of folding the airbag of FIGS. 1 to 3 will now be described.

Figure 4:
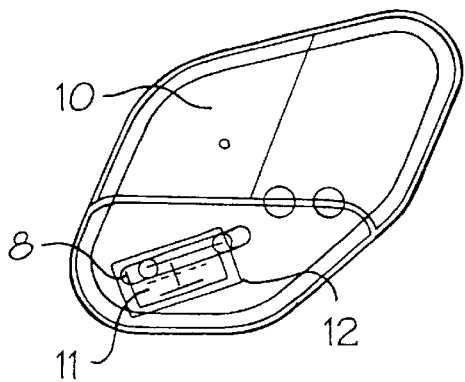
FIGS. 4 to 16 illustrate the method of folding the airbag of FIG. 1.

FIG. 4 shows the airbag 10 laid flat so that the side panels 1 and 2 overlie each other and the dividing panel 4 is folded in half between the side panels 1 and 2. The inflation inlet hole 11 is shown uppermost.

Figure 5:
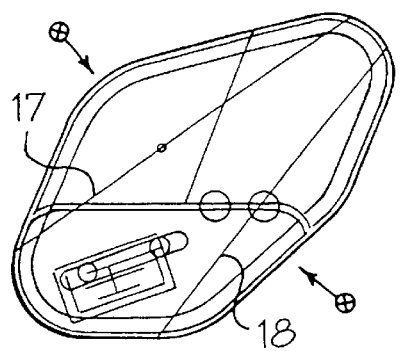
Figure 6:
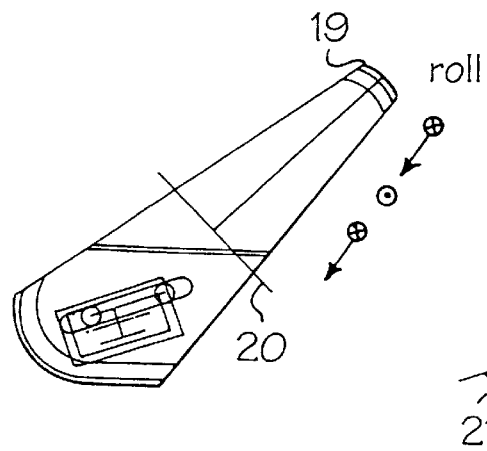
Figure 7:
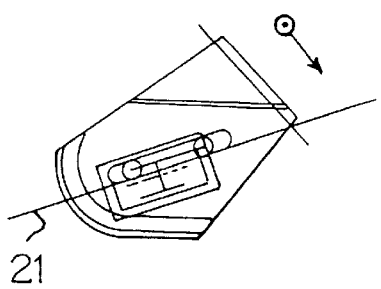

FIG. 5 shows the initial fold lines 17 and 18 and folds are made along these lines to tuck the sides underneath the body of the airbag 10 to form the shape of FIG. 6. Then the bag is rolled from the upper end 19 down to the line 20, preferably three times to form the shape of FIG. 7.

Figure 8:
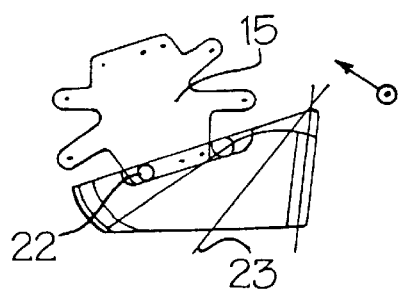

Subsequently the bag is folded along line 21, parallel to the major lines of the inflation inlet 11, and parallel to the tether mounting line 9 and this results in the shape of FIG. 8.

The paper cover 15 (see FIG. 3) is then attached as shown by lining up the points 22 (which appear as dots in the Figures) on one side of the cover with corresponding points shown on the tether mounting line 9.

Figure 9:
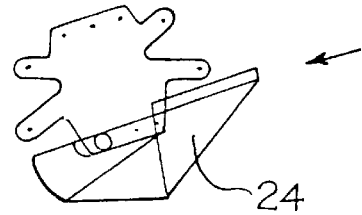
Figure 10:
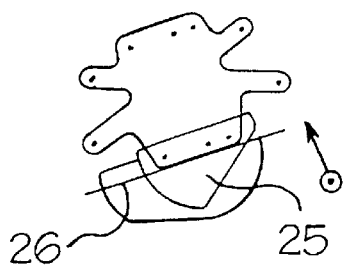
Figure 11:
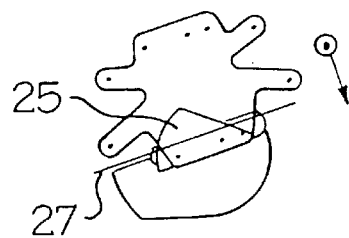
Figure 12:
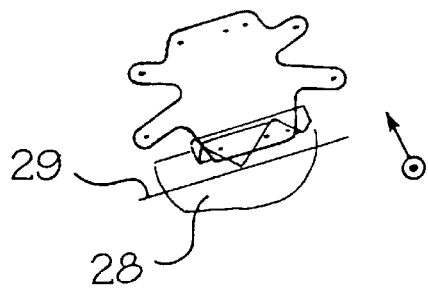
Figure 13:
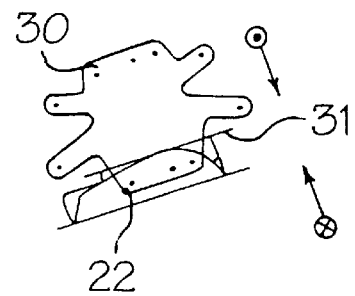
Figure 14:
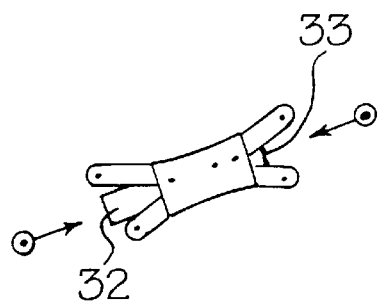
Figure 15:
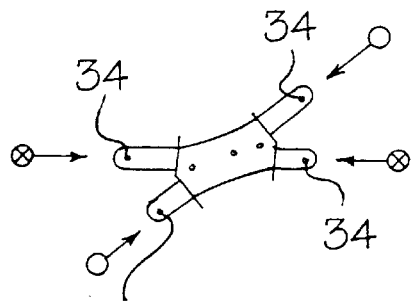

Line 23 provides the next fold line, resulting in the shape of FIG. 9 and then a section 24 is folded over to form the shape shown in FIG. 10. A flap 25 is folded up along fold line 26 as shown in FIG. 11 and is subsequently folded down again along line 29 to produce the shape shown in FIG. 13. The cover 15 is wrapped around the folded airbag so as to effectively encase it in a tube as shown in FIG. 14. This is accomplished by folding the bag under along line 31 and folding the cover over along the same line and tucking the upper edge underneath the folded bag. The cover may be held in place by spots of adhesive at points 22 and 30. The points 22 on one side of the cover 15 are aligned with points 30 on the opposing side of the cover 15 as shown.

Figure 16:
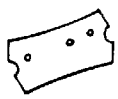

Subsequently the laterally extending portions 32 and 33 of the folded bag are tucked inside the cover (FIG. 15) and the cover arms 16 are folded under to form the folded covered shape of FIG. 16. The arms may be attached by spots of adhesive at points 34.

Of course not every step described and/or shown in these Figures is absolutely necessary and some steps may be omitted yet the same effect be achieved. It is however advantageous if the rolled section of the bag referred to with reference to (FIG. 6) comprise substantially the head section and that this be folded onto the thorax section as shown in FIG. 10. In this way, on inflation the head section is directed in a more vertical direction along the side of the vehicle structure providing a faster positioning of the head section into the desired inflated position than was previously possible with known folding methods.

This also reduces the interaction of the airbag with the interior trim of the vehicle and tends to reduce inflation induced injuries to the occupant in out-of-position situations since overall less airbag mass is accelerated in the longitudinal direction of the vehicle.

FIG. 17*a* shows an airbag suitable for mounting in the seat of a vehicle. As with the airbag of FIG. 1, it is formed from two panels 1 and 2 stitched around the periphery along line 3. An upper head compartment 5 and a lower thorax compartment 6 are separated by a dividing panel 4 through which a vent hole (not shown) is preferably formed. The alternative areas A, B and C indicated alternative inflation mounting areas. These are always positioned below the dividing panel 4 so as to inflate the thorax compartment 6 before the head compartment 5.

Figure 17C:
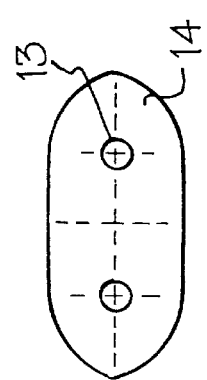

FIG. 17*b* shows an alternative form for a seat mounted airbag in which the upper head compartment 5 is formed extending at an angle compared to the lower thorax compartment 6. This is formed from a single piece of fabric folded along line 40 and stitched along its periphery. The dividing panel 4 is shown in FIG. 17*c* with vent holes 13 formed therein. A reinforcing panel for the mounting area 7 is shown in FIG. 17*d*.

Figure 17D:
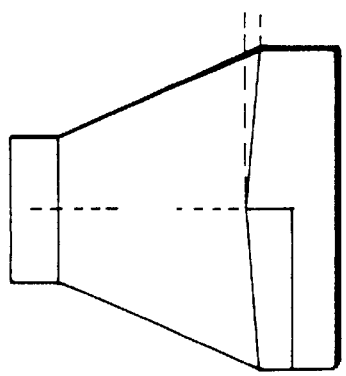

FIGS. 18 to 25 illustrate a method of folding the seat mounted airbag of FIG. 17*a* or of FIG. 17*b* to *d*.

Figure 18:
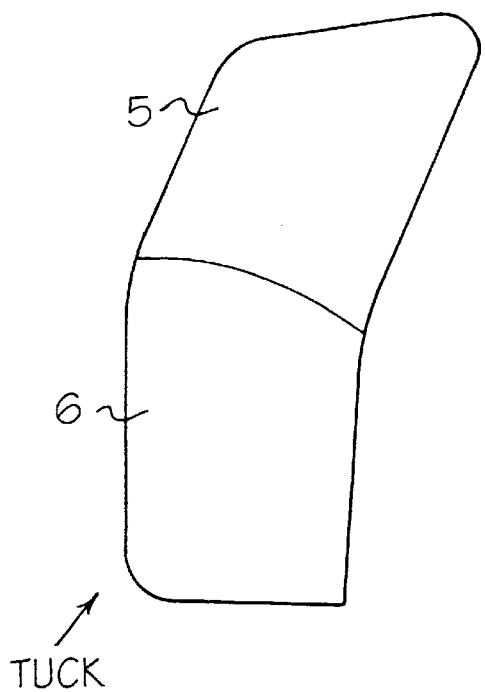
Figure 19:
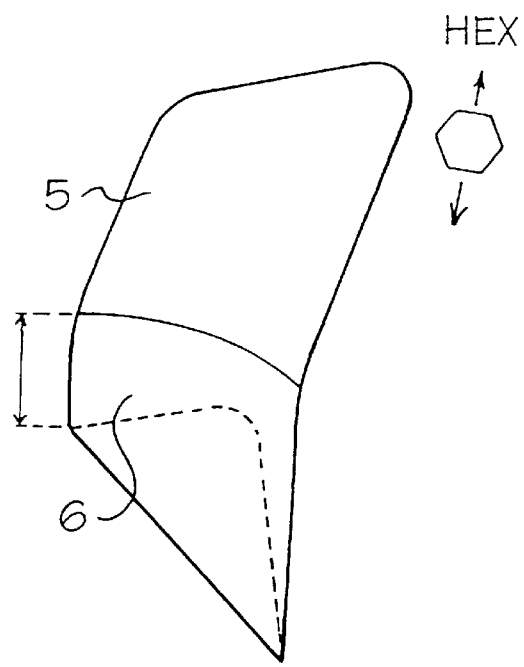
Figure 20:
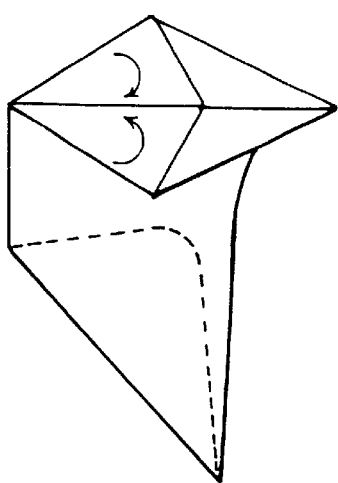
Figure 21:
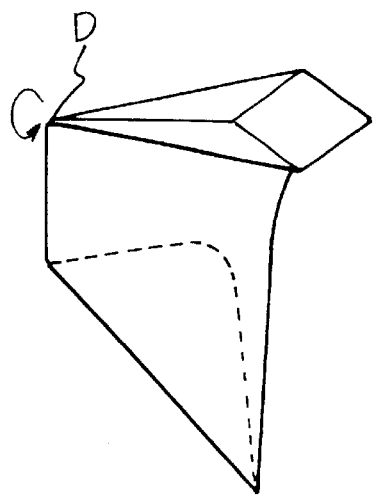
Figure 22:
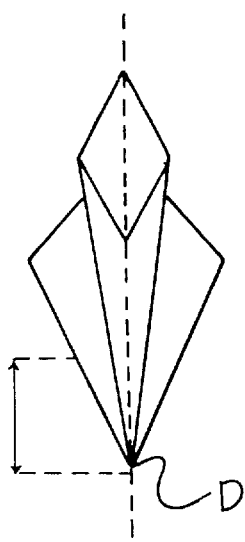
Figure 23:
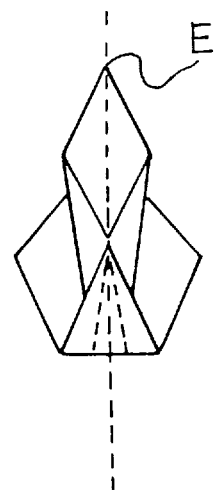
Figure 24:
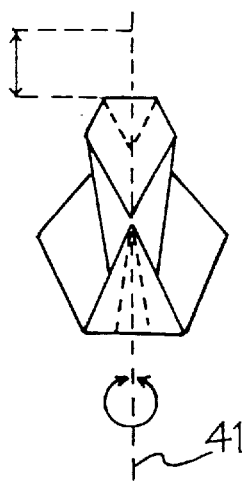
Figure 25:
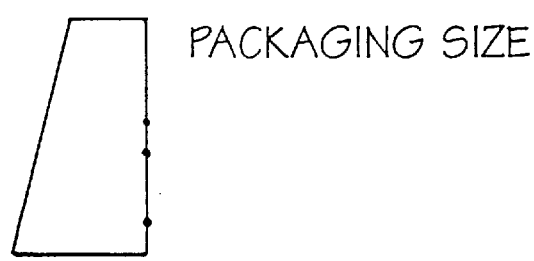
Figure 30:
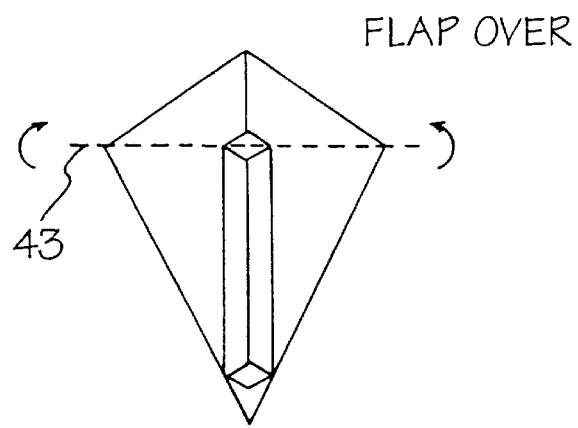
Figure 31:
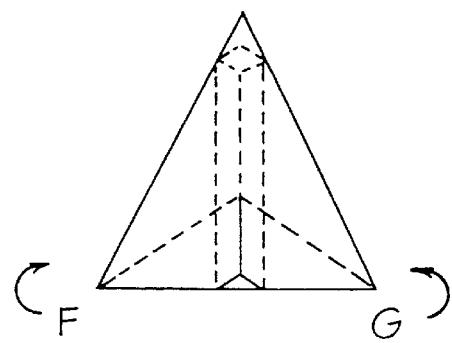

Firstly the airbag is laid generally flat as shown in FIG. 18. Then the lower left-hand corner is tucked under the airbag as shown in FIG. 19. Subsequently the top of the upper compartment 5 is folded down to take the shape shown in FIG. 20, i.e. a kite shape. Left-hand edges of the kite-shape are then folded in twice as shown in FIG. 21. Then the shape is turned through 90° flattened as indicated by FIG. 22. Then the corner D is folded over by about 150 mm to form the shape of FIG. 23. Subsequently the corner E is folded over by about 85 mm to form the shape of FIG. 24. This is then folded along line 41 to form generally the compact shape of FIG. 25.

Figure 32:
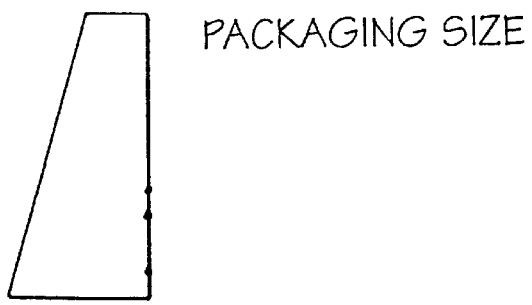

FIGS. 26 to 31 illustrate an alternative folding method which is nonetheless very similar to the method of FIGS. 18 to 25. The initial steps are identical in that the airbag is laid flat as shown in FIG. 26 and the bottom left-hand corner is tucked under as in FIG. 27. In this case however the upper section of the airbag is folded to achieve an elongated hexagon shape 42 in FIG. 28. The long sides of this elongated hexagon shape are folded over twice towards the middle as indicated by the arrows 43. This folded top portion is then folded down and rotated through 90° as shown in FIG. 29 so as to achieve the shape of FIG. 30. This shape is folded along line 43 to achieve the shape of FIG. 31 and then the corners F and G are folded over. The folded packaging shape is shown in FIG. 32 and this is generally the same as the shape shown in FIG. 25 which was achieved by the method of FIGS. 18 to 24.

FIGS. 33 to 35 illustrate a method of construction of a dual compartment airbag which has particular advantages. This construction method requires only two pieces of fabric. One piece of fabric is used for the upper head section 5 and another piece of fabric is used for the lower thorax section 6. The piece 5 is folded along centre line 44 and stitched around it periphery at 3. Subsequently the lower section 6 is attached at its outer edges 45 and 46 to lines 47 on the head sections. The vent holes 13 are formed in the centre region of the head section 5 and it will be seen that no intermediate panel 4 is required in this method of construction. The reinforcing inflation mounting patch is shown at 12 and the inflation inlet at 11. Of course the lower section 6 may be attached to the head section 5 first before the sections are stitched to form the compartments.

The airbag of FIGS. 33*a* and *b* is particularly applicable to a door mounted airbag, whereas a seat mounted airbag is shown in FIGS. 34*a* and *b*. As in FIGS. 33, the airbag is made from two pieces of fabric 5 and 6, the lower thorax section 6 is shown in FIG. 34*a* and the upper head section 6, again the inflator mounting area is shown at 7 and vent holes at 13.

FIG. 35 schematically illustrates the construction of the airbags of FIGS. 33 and 34. The single airbag of the upper compartment 5 is stitched along its periphery at 3. The lower section 6 of fabric is stitched at its open edges to the fabric shown at 5 along stitch lines 3 which are spaced on either side of the vent hole 13.

What is claimed is:

1. A side impact airbag comprising a first (6) and a second (5) inflatable compartment, the first compartment being adapted and mounted in a vehicle in a position from which it can inflate, on deployment in the event of a crash, to occupy an area generally adjacent to the thorax and the shoulder of a vehicle occupant, and the second inflatable compartment (5) being adapted to inflate, on deployment, to occupy an area generally adjacent to the head of the vehicle occupant, wherein the first (6) and the second (5) compartments are separated one from the other by a dividing panel (4) formed of airbag fabric and are pneumatically connected to each other by means of at least one vent hole (13) formed in the panel (4), wherein fabric of a first weight is used for the lower compartment (6) which protects the thorax and shoulder areas of the vehicle occupant, and the second, upper, compartment (5) of the airbag, which protects the head of the occupant, is formed of fabric of a second, lower, weight.

2. A side impact airbag according to claim 1 wherein the fabric of a first weight is a high strength and high weight fabric.

3. A side impact airbag according to claim 1 wherein the upper compartment (5) is formed of a low permeability and a low frictional fabric.

4. A side impact airbag according to claim 3 wherein said low permeability and low frictional fabric is fabric of 210 denier and the other fabric is of 630 denier.

5. A side impact airbag according to claim 1 wherein the dividing panel (4) is arranged to be in a position approximately at the level of the occupant's shoulder when the airbag is fully inflated.

6. A side impact airbag according to claim 1 wherein the lower compartment (6) has a hole for receiving inflation gas from an inflator in the event of airbag deployment.

7. A side impact airbag according to claim 1 wherein the airbag is formed of three pieces of fabric stitched together such that: a first piece forms one side wall (1) of the airbag, a second piece forms a second side wall (2) and a third piece forms the panel (4) dividing the two compartments.

8. A side impact airbag according to claim 7 wherein additional material is used for one or more tethers (8), and/or for reinforcing the gas inlet opening and/or for other strengthening of the airbag.

9. A side impact airbag according to claim 1 wherein the airbag is arranged and mounted so that as it inflates a rotational force is imparted to the upper, outer region of the airbag, relative to the vehicle occupant to bias the airbag to move towards the occupant.

10. A side impact airbag according to claim 9 wherein the airbag is mounted at an oblique angle to the horizontal.

11. A side impact airbag according to claim 10 wherein said angle is between 10° and 40° to the horizontal.

12. A side impact airbag according to claim 1 wherein the inflation profile of the airbag and the elongation of it towards the occupant during deployment is further controlled by retaining tethers (50, 51) within one or both inflatable compartments.

13. A side impact airbag according to claim 1 wherein stitches are provided joining side panels (1, 2) of the airbag together.

14. A side impact airbag according to claim 13 wherein the inflation profile of the airbag and the elongation of it towards the occupant during deployment is further controlled by stitches (35) forming one or more tucks in one or both side panels (1, 2).

15. A side impact airbag according to claim 13 wherein the stitches are arranged to burst at a predetermined pressure as the airbag inflates.

16. A side impact airbag according to claim 13 wherein the side panels and the dividing panel (4) are all formed from two pieces of fabric.

17. A side impact airbag according to claim 16 comprising a first piece of fabric of a predetermined denier, folded in half and stitched at the sides and the top to form the upper, head, compartment (5), one or two vent holes (13) formed in the middle region which forms the dividing panel (4), and a second piece of fabric of a different denier folded and stitched at the sides, the open top being joined by stitching to the upper, head, compartment on each side of the vent hole or holes (13).

18. A side impact airbag according to claim 17 wherein fabric pieces are used for reinforcement.

19. A side impact airbag according to claim 1 mounted in a vehicle door.

20. A side impact airbag according to claim 19 when mounted in the vehicle door trim.

21. A side impact airbag according to claim 1 wherein the airbag is mounted in the vehicle seat, either in the upholstery or in the structure of the seat itself.

22. A method of folding an airbag comprising laying an uninflated airbag generally flat so that it presents a generally oblong shape in plan view with two opposing minor sides and two opposing major sides, the airbag having a gas inlet opening (11) arranged at or in the region of a first minor side of the shape so formed, subsequently, folding or rolling the upper part of the airbag and folding the folded or rolled part to be on top of the lower part, and comprising as a first step: folding the two major sides inwardly towards a central major axis, preferably by folding the sides behind and underneath the body of the airbag; as a second step: rolling the minor side remote from the gas inlet opening down towards the gas inlet opening, preferably in a sense opposite to the first folding step including forwards and on top of the airbag, preferably rolling the fabric over three times; as a third step: turning the airbag over; as a fourth step: folding the resultant shape so as to bring the rolled second minor side generally parallel to and in close proximity with a generally diagonal line bisecting the resultant shape, in the region of the thorax portion of the airbag; as a fifth step: folding a top corner of the resultant shape over the rolled portion, as a sixth step: folding the sides inwardly on to the top of the rolled portion; and as a seventh step; folding one of the major sides over onto the shape thus formed, wherein the airbag comprises two interlinked inflatable compartments (5, 6), adjacent each other along the major sides and a first one of the compartments has an inflation opening (11) formed in one side wall and the walls of the second compartment comprise said rolled second minor side, so that the fourth step comprises laying the rolled minor side on the fabric of the first compartment.

* * * * *